WILLIAM H. DOANE.
Improvement in Pulley for Band-Saws.
No. 127,033. Patented May 21, 1872.
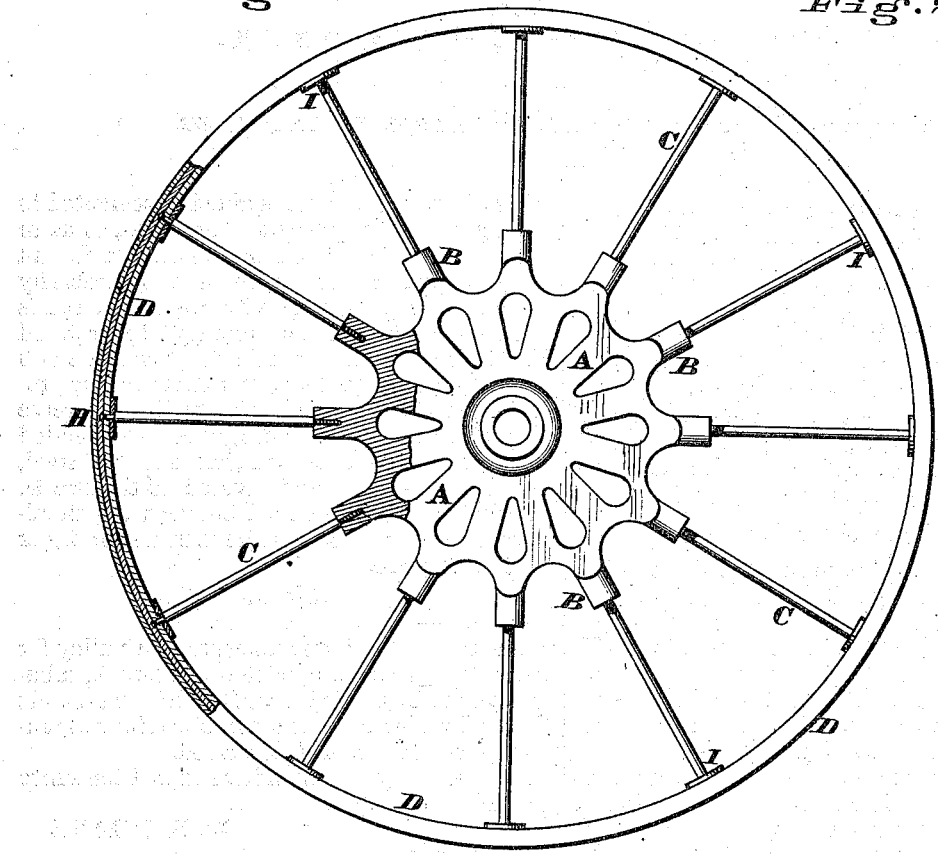
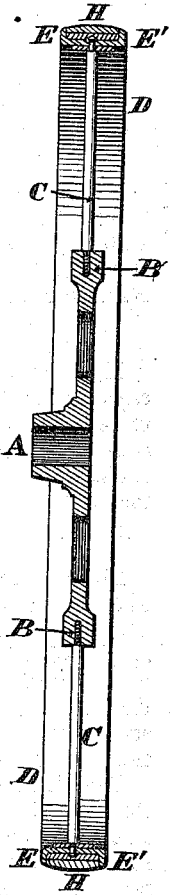
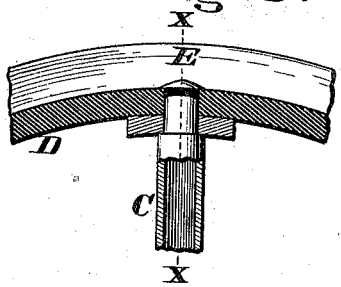
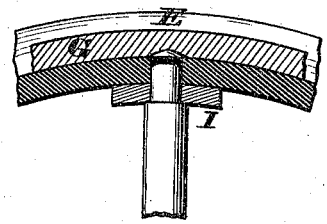
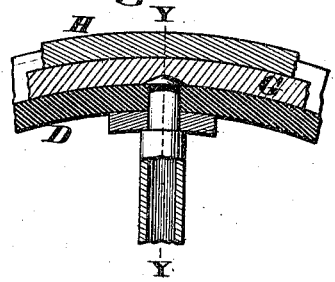
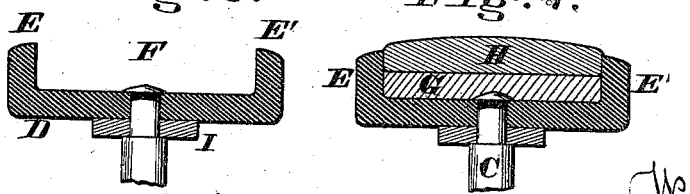

127,033

UNITED STATES PATENT OFFICE.

WILLIAM H. DOANE, OF CINCINNATI, OHIO.

IMPROVEMENT IN PULLEYS FOR BAND-SAWS.

Specification forming part of Letters Patent No. 127,033, dated May 21, 1872.

Specification describing an Improvement in Pulley for Band-Saws, invented by WILLIAM H. DOANE, of Cincinnati, in the county of Hamilton and State of Ohio.

General Description.

My invention consists in a pulley for band-saws, the rim of which is of sheet-steel, flanged or turned up at its edges for the reception of a band of leather; said pulley having tubular spokes secured to the hub and tire, as hereinafter more fully set forth.

Description of the Drawing.

Figure 1 is a partially-sectionized elevation of a band-saw pulley embodying my invention. Fig. 2 is an axial section of the same. Figs. 3, 4, and 5 are sections in the plane of the pulley, and to a larger scale, showing a portion of the tire or rim in three successive stages of manufacture. Figs. 6 and 7 are sections in the lines $x\,x$ and $y\,y$, respectively.

The tire D of the "wheel" or metallic portion of my pulley is composed of sheet-steel, and is curved or turned upward at its edges, so as to both stiffen it and to present a circumferential dish or trough, F, for the reception and security of a flexible band or covering, G, of leather. This band is glued or cemented to the upturned periphery of the wheel, so as to occupy and be confined by the trough F, and is afterward turned off, so as to be precisely circular and concentric with the shaft, and is then encircled by the customary rubber band H. A is a cast-iron or other cast metallic hub or web of open pattern, and encircled by projecting screw-threaded sockets B to receive and hold the correspondingly screw-threaded tubular spokes C of wrought-iron or steel, which are tenoned and riveted to the tire D. Washers I are introduced between the shoulders of the tenons, and the intrados or inner side of the tire.

Claim.

I claim—

As an article of manufacture, the pulley for band-saws, consisting of the open hub A, tubular spokes C, flanged rim D E E', and bands G H, all constructed and combined in the manner herein shown and described.

In testimony of which invention I hereunto set my hand.

W. H. DOANE.

Witnesses:
GEO. H. KNIGHT,
JAMES H. LAYMAN.